No. 857,498. PATENTED JUNE 18, 1907.
W. G. TEMPLETON.
CHEESE CUTTER.
APPLICATION FILED JUNE 30, 1906.
2 SHEETS—SHEET 1.
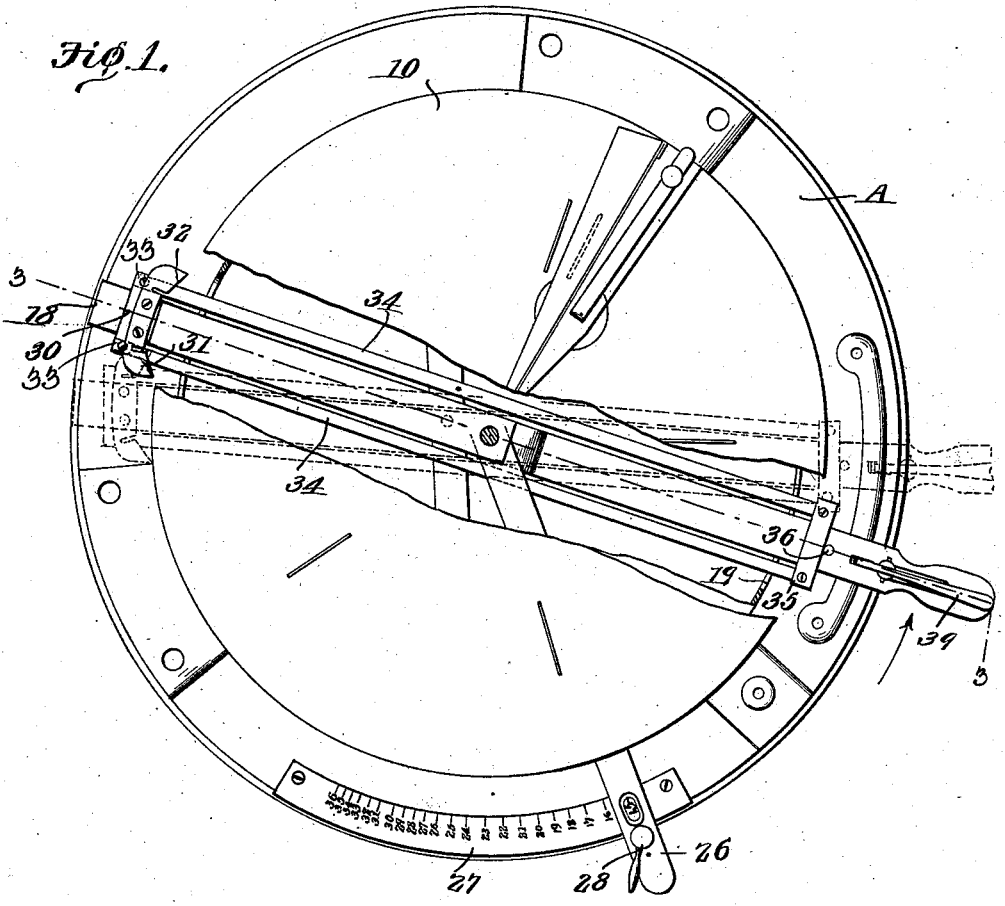
WITNESSES: William G. Templeton, INVENTOR
By C. A. Snow & Co.
ATTORNEYS

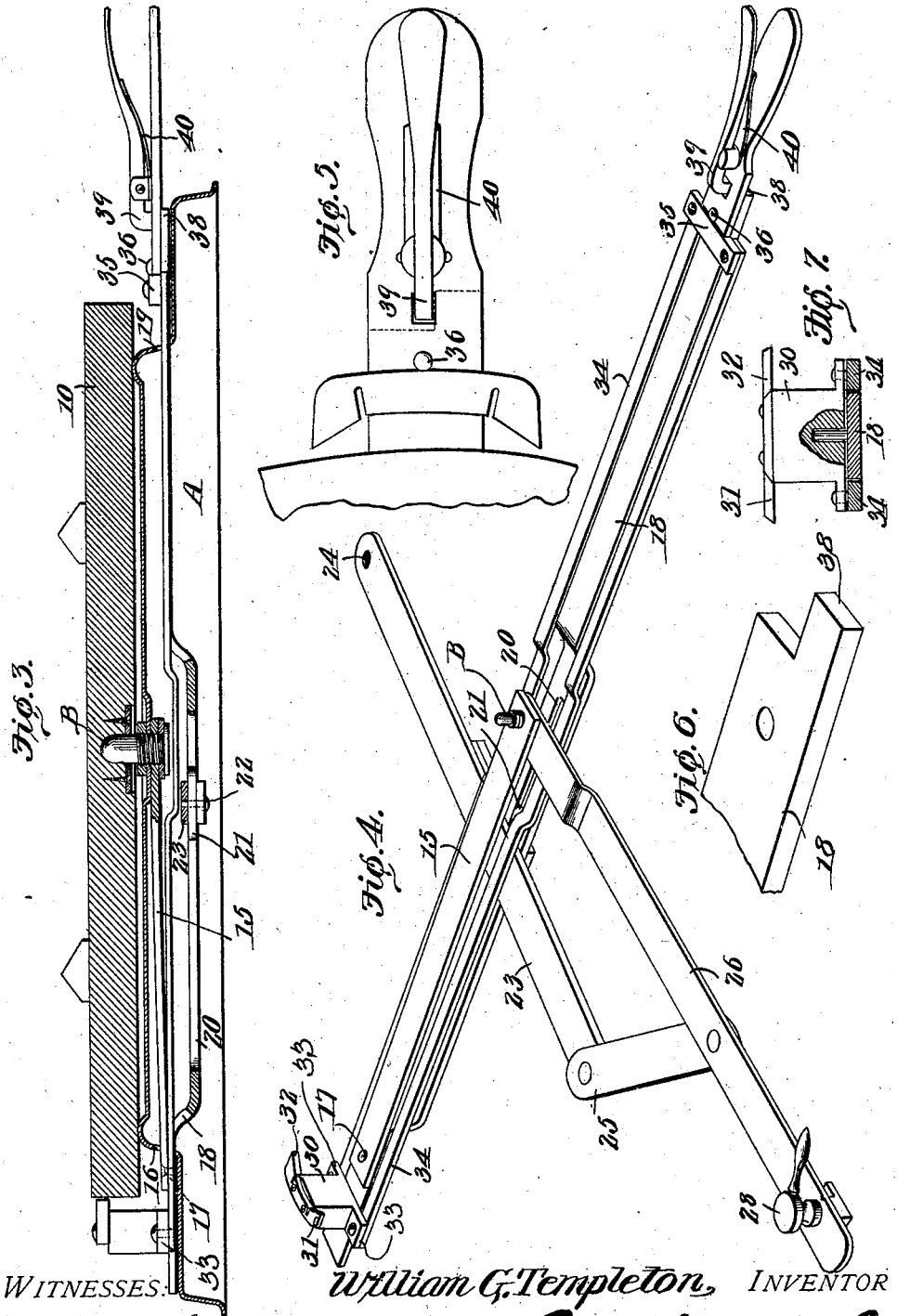

]
UNITED STATES PATENT OFFICE.

WILLIAM GORDON TEMPLETON, OF COLORADO SPRINGS, COLORADO.

CHEESE-CUTTER.

No. 857,498.

Specification of Letters Patent.

Patented June 18, 1907.

Application filed June 30, 1906. Serial No. 324,231.

*To all whom it may concern:*

Be it known that I, WILLIAM GORDON TEMPLETON, a citizen of the United States, residing at Colorado Springs, in the county of El Paso and State of Colorado, have invented a new and useful Cheese-Cutter, of which the following is a specification.

This invention relates to cheese cutters, and has for its principal object to provide an improved means for rotating the cutter board.

A further object of the invention is to provide a cutter board rotating means which may be made effective for rotating the board in both directions.

A still further object of the invention is to provide a cutter board rotating mechanism which may be adjusted with the utmost accuracy for moving the board through a predetermined angle.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a plan view of the base and cutter board of a cheese cutter provided with a cutter board rotating means constructed in accordance with the invention. Fig. 2 is a similar view of a portion of the same, showing the rotating mechanism adjusted for rotating the cutter board in the reverse direction. Fig. 3 is a transverse sectional view through the base and cutter board on the line 3—3 of Fig. 1. Fig. 4 is a detail perspective view of the rotating mechanism, detached. Fig. 5 is a plan view illustrating a slight modification of the invention. Fig. 6 is a detail perspective view of the handled end of the main lever. Fig. 7 is a detail sectional view on the line 7—7 of Fig. 3, showing the pivotal connection between the lever and the pawl block.

Similar numerals of reference are employed to indicate corresponding parts throughout the several figures of the drawings.

The base A of the cheese cutter may be formed of any suitable material, preferably stamped sheet metal, and said base is provided with a centrally disposed pin or spindle B on which is mounted a cutter board 10 that is formed of any suitable material. The board is preferably made of wood, and is composed of several laminæ, or it may be formed of vulcanized fiber or other material. On the lower portion of the pivot pin B, preferably at a point below the base plate is pivoted a lever 15 that extends through a slot 16 formed in one of the vertical flanges of the base plate and is connected by a pivot pin or screw 17 to a lever 18 that extends completely across the base plate, and passes through a slot 19 that is diametrically opposite the slot 16. The lever 18 is provided with an elongated slot 20 for the reception of a slidably adjustable block 21 that is connected by a pivot pin 22 to a lever 23 that is pivoted on a stud 24 to the lower face of the base plate. The opposite end of the lever 23 is connected by a link 25 to a lever 26, the inner end of which is pivoted on the pin B, while the outer end is adjustable over an arcuate scale 27, bearing marks indicating the weights of cheese, or such other designating marks as circumstances may suggest or require. The lever, is, also, provided with a screw clamp 28, of any ordinary construction, by which it may be locked in adjusted position. The lever 18, therefore, is fulcrumed on the pin 22, and this fulcrum may be shifted by the lever 26, and by altering the fulcrum, the effective movement of the lever 18 is altered, so that at each operation a larger or a smaller quantity of cheese may be moved past the cutting knife. The object generally is at a single movement to so adjust the cheese that a single pound of predetermined value may be cut, and if more than one pound is desired the operating device is again moved.

To the rear end of the bar 18 is pivoted a block 30, and to the top of the block is secured a double pawl 31—32 which may have sharpened or pointed ends movable into engagement with the periphery of the cutter board, and the latter is preferably, though not necessarily, provided with small indentations into which the pawls will move. The opposite sides of the block are provided with ears 33 to which are pivoted the rear ends of rods 34 that extend parallel with the bar 18, and are pivotally connected to a cross bar 35 at the front end of the bar 18.

The cross bar 35 forms a part of a T- shaped handle that is pivoted on a stud 36 carried by the bar 18, and when this handle is grasped and moved in the direction indicated by the arrows, the first effect of the movement will be to shift the bars 34 and turn the block 30 on its pivot until the pawl 31 firmly impinges against the periphery of the cutter board. Continued movement of the handle in the same direction will then revolve the cutter board through an arc, the dimensions of which are determined by the adjustment of the lever 26.

As it is desirable in some instances to provide for the turning of the cutter board in the reverse direction, the end of the bar 18 is provided with a projection 38, forming a shoulder against which the downturned end of a pivotally mounted lever 39 may engage, said lever being normally held in shoulder engaging position by a spring 40. Under normal conditions, the movement of the operating handle first swings the pawl 31 into engagement with the cutter board, and then as the movement is continued, the cutter board commences to revolve, as previously described. The movement of the handle, will, at the starting of the return, carry the end of the lever 39 against the shoulder 38, until the handle is parallel with the lever, and thereafter the lever or bar will be swung back, while the pawl carrying block extends in a plane directly at right angles to the length of said lever. If, however, it is desired to turn the cutter board in the reverse direction, the handled portion of the lever 39 is depressed until the lower end thereof is raised above the shoulder 38, and then, if the handle is turned in a direction the reverse of that indicated by the arrow, the movement will be transferred to the pivot block 30 in the reverse direction, and the pawl 32 will be moved into engagement with the edge of the cutter board, and as the movement of the lever continues, the cutter board will be turned through the desired arc.

It is not in all cases essential that the pawl carrying block be arranged at the rear of the board, for, in many cases, the block may be placed at the front of the board, as shown in Fig. 5, the block in this instance being shown as arranged directly at the inner end of the handle, and the double pawl is secured to the block in such manner that on the first movement of the handle in either direction, one or the other of the pawls must engage with the periphery of the cutter board.

I claim:—

1. The combination with a revoluble cutter board, of an operating lever, a block pivoted thereto and provided with a pair of oppositely arranged cutter board engaging teeth, and means for turning the block to engage either of the teeth with the board to effect rotative movement of the board in either direction.

2. In a cheese cutter, the combination with a revoluble cutter board, of a lever carrying movable means for engaging the board, whereby motion may be communicated in either direction from the lever to the board, a handle movably mounted upon the lever and operatively connected with said board engaging means for throwing the same into engagement with the board, and movable means for controlling the direction of movement of the handle with reference to the lever.

3. In a cheese cutter, the combination with a revoluble cutter board, of a lever carrying movable means for engaging the board, whereby motion may be communicated in either direction from the lever to the board, a handle movably mounted upon the lever and operatively connected with said board engaging means for throwing the same into engagement with the board, and movable stop devices for controlling the extent of movement of the handle with reference to the lever in one direction.

4. The combination with a revouble cutter board, of an operating lever extending under the board, a handle member pivoted to the front end of the lever and movable independently thereof to a limited extent, a toothed cutter board engaging block pivoted to the opposite end of the lever, and a connecting rod extending between the handle and the block.

5. The combination with a revoluble cutter board, of an operating lever extending under the board, a handle pivoted to the front end of the lever and having limited independent movement, a block pivoted to the rear end of the lever and provided with a pair of cutter board engaging teeth, and a pair of connecting rods arranged on opposite sides of the lever and extending between the handle and the block.

6. The combination with a revoluble cutter board, of an operating lever extending under the board, a toothed block pivoted to the rear end of the lever, a handle pivoted to the front end of the lever, a rod extending between the handle and the block, a pivotally mounted latch carried by the handle and having one end extending through an opening in the handle, and a lug or shoulder projecting from the lever and arranged to be engaged by said catch.

In testimony that I claim the foregoing as my own, I have hereto affixed my signature in the presence of two witnesses.

WILLIAM GORDON TEMPLETON.

Witnesses:
FRANK W. MITCHELL,
W. H. BORDEN.